United States Patent [19]

Langeland et al.

[11] Patent Number: 4,783,246

[45] Date of Patent: Nov. 8, 1988

[54] BIPOLAR RAPID PASS ELECTROLYTIC HYPOCHLORITE GENERATOR

[75] Inventors: Leonard E. Langeland, Houston; Charles W. Clements, Stafford, both of Tex.

[73] Assignee: ELTECH Systems Corporation, Boca Raton, Fla.

[21] Appl. No.: 127,122

[22] Filed: Dec. 1, 1987

[51] Int. Cl.⁴ .............. C25B 1/26; C25B 9/00; C25B 11/10

[52] U.S. Cl. .................. 204/95; 204/268; 204/269; 204/290 F

[58] Field of Search ............... 204/95, 268–269, 204/29

[56] References Cited

U.S. PATENT DOCUMENTS

| | | | |
|---|---|---|---|
| 2,887,444 | 5/1959 | Lindstaedt | 204/237 X |
| 3,265,526 | 8/1966 | Beer | 117/50 |
| 3,305,472 | 2/1967 | Oldershaw et al. | 204/269 X |
| 3,632,498 | 1/1972 | Beer | 204/290 F |
| 3,711,385 | 7/1973 | Beer | 204/59 |
| 3,873,438 | 3/1975 | Anderson et al. | 204/268 |
| 3,925,176 | 12/1975 | Okert | 204/152 |
| 3,926,770 | 12/1975 | Hoekje | 204/256 |
| 4,064,032 | 12/1977 | Bouy et al. | 204/270 |
| 4,179,347 | 12/1979 | Krause et al. | 204/149 |
| 4,248,690 | 2/1981 | Conkling | 204/268 |
| 4,292,175 | 9/1981 | Krause et al. | 210/192 |
| 4,305,806 | 12/1981 | Holca | 204/268 |
| 4,436,605 | 3/1984 | Holca | 204/225 |
| 4,461,692 | 7/1984 | Raetzsch | 204/269 X |
| 4,528,084 | 7/1985 | Beer et al. | 204/290 |

Primary Examiner—Donald R. Valentine
Attorney, Agent, or Firm—John J. Freer

[57] ABSTRACT

A hypochlorite generator is disclosed which can make use of multiple, flat, plate-like bipolar electrodes. The electrodes are housed in non-conductive casing members which can be outfitted with fastening means that facilitate easy access for inspection and cleaning of electrodes. Bipolar electrodes are recessed in the casing members whereby a fluid flow passageway is left between plate electrodes. Desirable fluid flow velocities may be achieved, coupled with excellent cell efficiencies.

40 Claims, 3 Drawing Sheets

BIPOLAR RAPID PASS ELECTROLYTIC HYPOCHLORITE GENERATOR

BACKGROUND OF THE INVENTION

It has been useful for hypochlorite generation from seawater or other brine solutions, as for sewage treatment and disinfection, to provide on-site electrolytic cells. Such cells can frequently have plate anodes and cathodes arranged in parallel with the resulting parallel plates being closely spaced apart and all contained in a single housing member. For various devices and electrode plate configurations see for example U.S. Pat. Nos. 3,925,176, 4,179,347, 4,292,175 and 4,248,690.

It has also been proposed for on-site hypochlorite generation to provide concentric electrodes. This configuration includes an insulating spacer between anode and cathode. An additional concentric electrode can either be mounted within the anode, spacer and cathode, or the additional cathode can house such anode, spacer and cathode. In either case, the additional electrode serves as a bipolar electrode, such as has been shown in U.S. Pat. No. 3,873,438.

It would however be desirable to provide multiple bipolar electrodes within a generator housing while maintaining excellent cell efficiency coupled with high fluid throughput. It would also be highly desirable to provide such a cell adapted for easy access, thereby facilitating cleaning and repair.

SUMMARY OF THE INVENTION

An electrolyzer for the production of hypochlorite has now been constructed which permits enhanced voltage and reduced amperage operation without sacrifice in efficiency. The generator is sturdy and has long-life. In addition to ruggedness of construction, the generator can be readily accessed for cleaning and repair. Highly desirable hypochlorite production efficiency can now be achieved while minimizing current leakage and while operating with augmented brine flow. The electrolyzer offers compactness so as to be capable of placing into limited space, e.g., as on shipboard. Yet the unit provides for easy cleaning, i.e., it can be readily opened for regular maintenance, enhancing utilization which is free from apparatus plugging.

Broadly, the present invention is directed to an electrolyzer for producing hypochlorite by the electrolysis of brine wherein brine flows within a housing containing at least one bipolar electrode contained in an inner electrolyte compartment. The electrolyzer comprises: an electrically non-conductive outer casing, the casing having a fluid inlet and a fluid outlet and being comprised of two casing members each having inner shallow depressions, with the members, upon closing together providing a shallow, inner compartment; gasket means around the periphery of at least one casing member inner area surrounding the shallow depression of such member; flat, internal plate-like electrode elements in each of the casing members including at least one bipolar electrode, such electrode elements being affixed in the shallow depressions of the casing members, with individual electrode elements in one casing member being offset with respect to the electrode elements in the opposing casing member, whereby the anodic surface of a bipolar electrode in one casing member faces a cathodic surface of an electrode in the opposing casing member, forming an electrolytic cell therebetween; a fluid flow passageway between opposing faces of the electrodes, such passageway connecting to the fluid inlet and fluid outlet; binding means for fastening a broad face of each electrode to a casing member; fastening means for binding together the casing members; and electrode terminals mounted through a wall of at least one of the casing members for external connection to current leads and for connecting internally of the outer casing to electrode elements.

In another aspect, the invention pertains to a novel electrolyzer housing as well as to the bipolar electrodes for mounting in such a housing.

DESCRIPTION OF THE PREFERRED EMBODIMENTS

In general, the hypochlorite electrolyzer will be scaled for use in such applications where on-site hypochlorite generation can be useful. The invention will thus find utility on ships, in offshore installation, e.g., drilling platforms, as well as in salt water streams for sewage treatment and disinfection. These electrolyzers are operational with brine, either natural or synthetic and including seawater, for generating hypochlorite, e.g., sodium hypochlorite from a brine solution comprised of sodium chloride in water.

Figure 1:
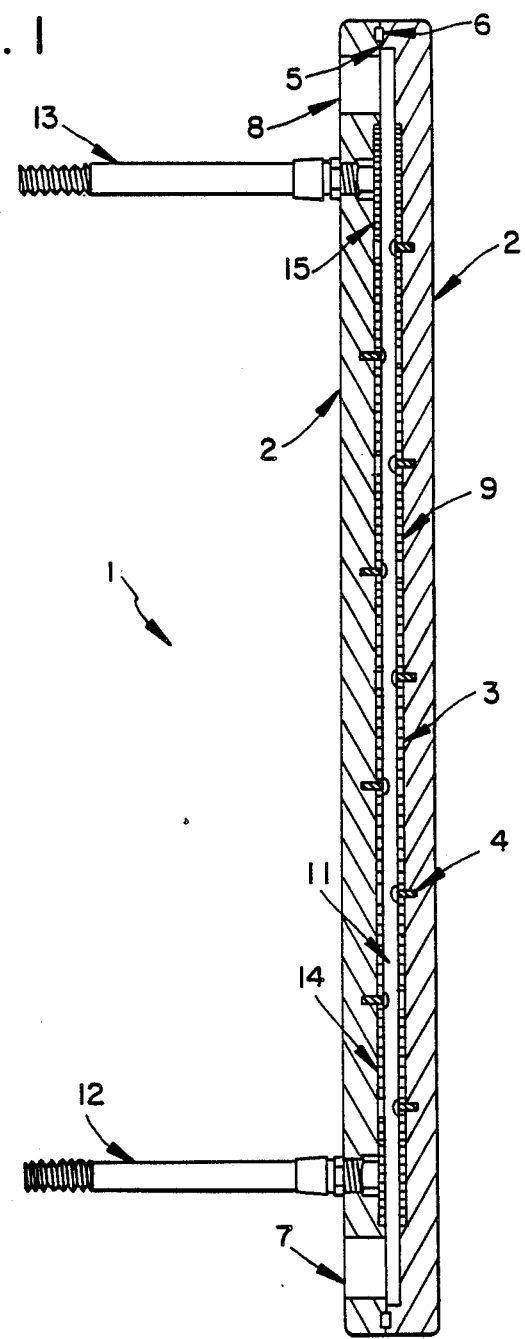
FIG. 1 is a side elevational view in cross-section, of a rapid pass hypochlorite electrolyzer of the present invention.

In reference to the drawings, the same identifying number has generally been used for the same element in each of the figures. Referring to FIG. 1, there is depicted in side elevational view an electrolyzer 1. Generally, the electrolyzer 1 is formed of two elongated electrically non-conductive casing members 2. These casing members 2 have been brought together, in closed position, to form the electrolyzer 1. Each casing member 2 houses flat, plate-like electrode elements 3 which are fastened to the casing members 2 by means of non-conductive fastening elements 4. One casing member 2 has an outer rim 5. Within this outer rim 5 is a gasket 6 contained in shallow depressions, with these depressions being firstly in the outer rim 5 and secondly in the face of the opposite casing member 2.

In one casin member 2 there is provided a lower fluid inlet 7 and an upper fluid outlet 8. The electrode elements 3, which are inserted and fill shallow depressions on the inner face of the casing members 2, are separated one from the other in each casing member 2 by casing ribs 9. When the pair of casing members 2 are brought together, the outer rim 5 provides for a spacing apart of the electrode elements 3 which face one another, thereby creating a fluid flow passageway 11 between the electrode elements 3.

The casing member 2 containing the lower fluid inlet 7 and upper fluid outlet 8 likewise has a lower anode terminal 12 and an upper cathode terminal 13. These terminals 12,13 are mounted through the wall portion of the casing member 2. For the anode terminal 12, this mounting through the wall connects the terminal to a primary anode plate 14. Across the fluid flow passageway 11 from this primary anode plate 14 is an electrode element 3 which is approximately twice the height of the primary anode plate 14. Thus this opposite electrode element 3 is a bipolar electrode opposite the primary anode plate 14. Similarly, the upper cathode terminal 13 connects with a primary cathode plate 15. This primary cathode plate 15 likewise has, across the fluid flow passageway 11, an electrode element 3 of at least approximately twice the height of the primary cathode plate 15. This opposite, electrode element 3 thus is a bipolar electrode. Other than the primary anode plate 14 and primary cathode plate 15, all electrode elements 3 depicted in FIG. 1 are bipolar electrodes. Also, the facing bipolar electrodes of one casing member 2 are offset in regard to the bipolar electrodes of the opposing casing member 2.

In operation, the lower anode terminal 12 and upper cathode terminal 13 are connected externally to a current supply, not shown. Current is thereby able to flow from the primary anode plate 14 and to the primary cathode plate 15. A brine solution is introduced into the electrolyzer 1 through the lower fluid inlet 7 and passes through the fluid flow passageway 11 between the electrode elements 3. Spent brine solution as well as electrolysis products leave the electrolyzer 1 through the upper fluid outlet 8. Owing to the offset nature of the electrode elements 3 from one casing member 2 to the other, these elements 3 serve as bipolar electrodes and are activated by conductance of the brine solution. A DC current potential applied to the anode and cathode provides a DC current flow in a staggered path through the brine solution from the cathode downward to the anode.

Figure 2:
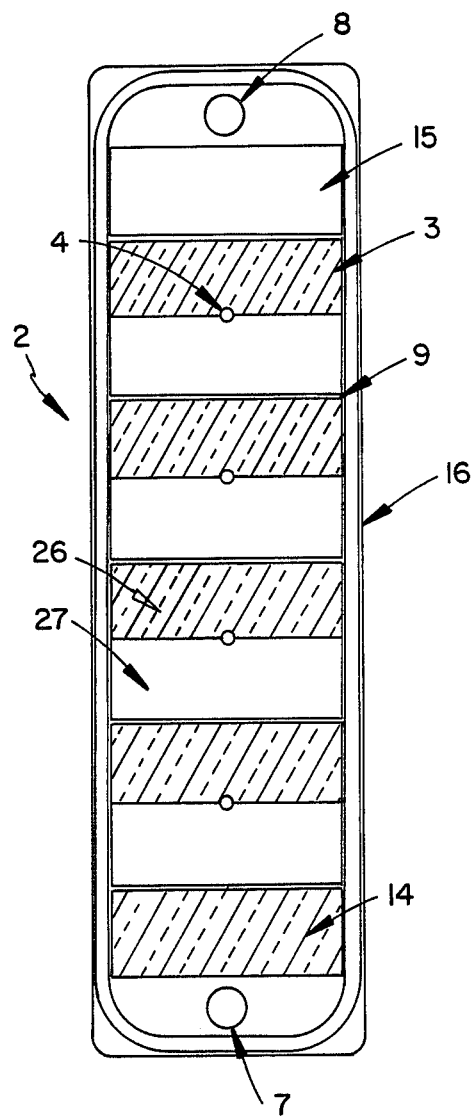
FIG. 2 is a front elevational view of the inner face of a casing member, with electrodes attached, for the electrolyzer of FIG. 1.

In FIG. 2, an elongated casing member 2 is shown in front view. At the bottom of the casing member 2 is a lower fluid inlet 7. Above this inlet 7 is a primary anode plate 14, which may also be referred to herein as the terminal anode section 14. Above this primary anode plate 14 is a set of four bipolar electrode elements 3. These bipolar electrode elements 3, have a metal cathode face, or cathode section, 27 plus a catalytic anode face, or anode section, 26. Above the uppermost bipolar electrode element 3 is a primary cathode plate, or terminal cathode section, 15. The electrode elements 3 are separated from themselves and from the primary anode plate 14 and primary cathode plate 15 by individual casing member ribs 9. Also the individual electrode elements 3 and the primary plates 14,15, have broad back faces secured to the casing member 2 by means of non-conductive fastening elements 4 that are centrally positioned within the electrode elements 3. The electrode elements 3 and primary plates 14,15 will generally have square or rectangular broad faces and the rectangular primary plates 14,15 have a long axis that runs transverse to the longitudinal axis of the elongated casing member 2. Above the primary cathode plate 15 is an upper fluid outlet 8. Around the outside of the casing member 2 is a peripheral groove 16 for receiving a gasket member, not shown.

Figure 3:
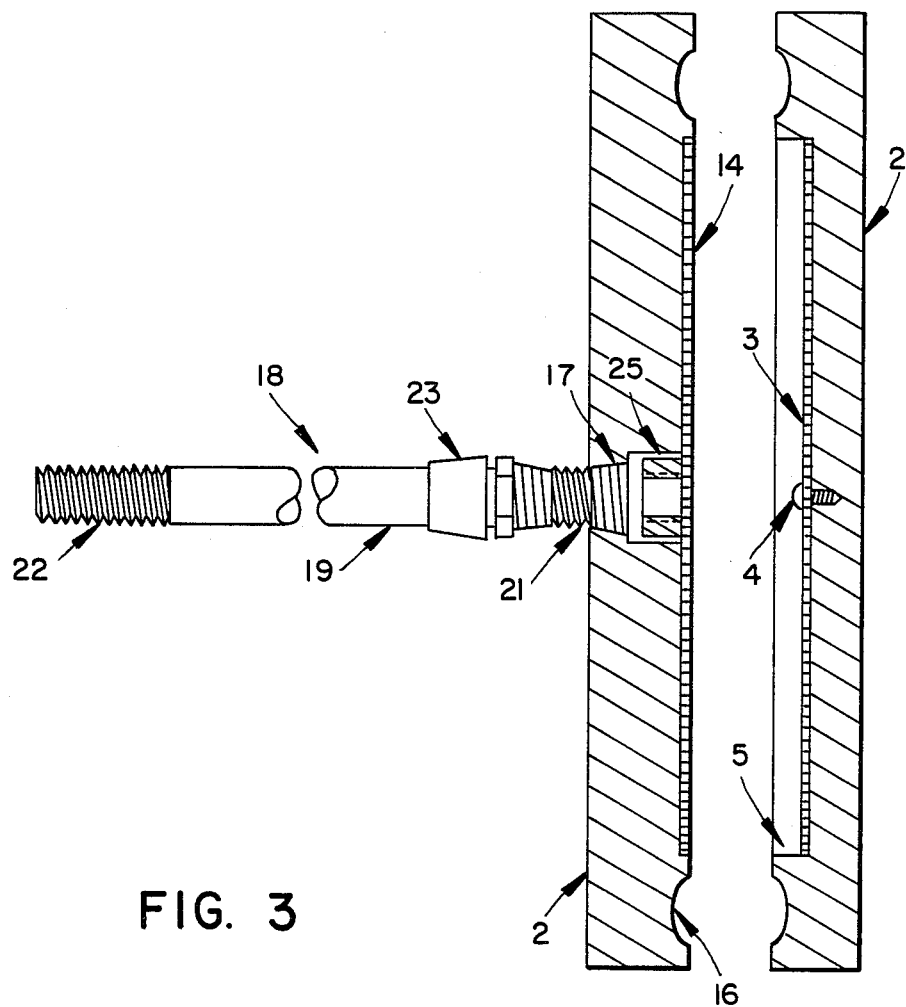
FIG. 3 is a top view, in cross-section, of an electrolyzer casing member pair.

Referring next to FIG. 3, one casing member 2 has electrode elements 3 and the other casing member 2 has a primary anode plate 14. These electrodes 3,14 are each affixed to the casing member 2 by means of non-conductive fastening elements 4. One of the casing members 2 has an outer rim 5 that serves as a spacer. Thus upon closing of the casing members 2, the outer rim 5 presents a space, i.e., a fluid flow passageway, between the electrodes 3,14. The outer rim 5 as well as the opposite facing area of the other casing member 2 each contain a peripheral groove 16. These peripheral grooves 16 match up to form an aperture which can be filled by a gasket, not shown, upon closing of the casing members 2. In the one casing member 2 there is additionally provided a terminal connection aperture 17 whereby an electrode terminal 18 can be inserted for fastening to a lug 25 connected to a primary anode plate 14. More particularly, the electrode terminal 18 has a post 19, threaded at each end. The one set of post threads 21 can be tightened into the lug 25 which itself is fastened, e.g., welded onto the anode plate 14. The opposite threaded end 22 of the post 19 is for connection to a current lead, not shown. About the post 19, a coupling element 23 is provided for securing the electrode terminal 18 to the casing member 2.

At a minimum the electrolyzer will contain one primary anode plate 14 and one pirmary cathode plate 15, preferably in one casing member 2, with the opposite casing member 2 containing one bipolar electrode element 3. Advantageously for enhanced hypochlorite generation each casing member 2 will contain at least one bipolar electrode element 3 and preferably a series of such bipolar electrode elements 3 will be used in each casing member 2, e.g., 3–5 such elements 3 in each member 2. In this regard, the one casing member 2 will carry a number of bipolar electrode elements 3 as represented by "n", it then being that the opposing casing member 2 will have n-1 bipolar electrode elements, with n being a whole number including 1. Although it has been depicted in the figures that the primary anode and cathode plates 14,15 be in the same casing member 2, this need not be the case. Moreover the fluid inlet 7 and fluid outlet 8 may be in different casing members 2. Furthermore, more than one inlet 7 and outlet 8 can be utilized. It has been found that the overall structure of the inlet 7 and outlet 8, plus electrode arrangement, permits high velocity material flow across the front faces of the electrode elements 3.

The casing members 2 are preferably made of machineable or moldable plastic that is resistant to brine and which is non-conductive, e.g., they may be prepared by polyvinyl chloride. Additional suitable materials for the casing members 2 include chlorinated polyvinyl chloride, such as for high temperature operation, e.g., at brine temperatures above about 110° F., as well as such materials including glass fiber reinforced polypropylene and acrylonitrile-butadine-styrene (ABS) resins. The gaskets can be O-rings made from suitable elastomeric materials such as ethylene-propylene diene monomer (EPDM), neoprene, vinyl and other like materials which are stable in brine. Although the casing members are preferably elongated to accommodate multiple bipolar electrodes, it is contemplated that members other than elongated members can also be useful.

The electrode elements within the casing members are flat, plate-like elements. Such plates are typically on the order of about 0.1 centimeter thick and usually, for economy, will not be of a thickness exceeding about 0.65 centimeter. One broad plate face, or "back face", will be secured to a casing member by means of non-conductive fastening means, e.g., nylon screws. The opposite face, or "front face", may be elemental metal, as for the primary cathode, or partly coated to serve as a bipolar electrode, or completely coated for the primary anode. From one casing member to its opposing member, the electrode elements are offset, as shown in the Figures, whereby the current flow through the brine electrolyte can follow a staggered path. For multiple electrodes in an individual casing member, these are offset from one another, as by casing member ribs. Advantageously such spacing will not exceed about 4 centimeters, to maximize electrode area while desirably suppressing current leakage. On the other hand, a spacing of at least about one centimeter is preferred for best current leakage suppression. It is to be understood that such spacing may be adjusted in regard to the degree of salinity of the brine being electrolyzed.

The fluid flow passageway occurring between faces of electrode elements may be created by the depth of the depressions in the casing members, or by the casing member rim, or by both. Such passageway will be advantageously at least as wide as the electrode element width. For combining desirable fluid flow with efficient hypochlorite generation, the passageway thickness, or depth between electrodes, will be at least about 0.3 centimeter. On the other hand, a depth exceeding about one centimeter can lead to enhanced fluid flow, but without commensurate improvement in hypochlorite generation. Moreover, the ratio of the spacing between electrodes to the distance across the fluid flow passageway, i.e., the thickness of this passageway, will be between about 1:1 and 8:1. Advantageously, for desirable hypochlorite generation coupled with current leakage suppression, such ratio will be between about 1.5:1 and 3:1. It is to be understood that both casing members, for a member pair, may contain a rim. Conveniently when one or more rims are present, the gasketing means are present in such rims.

Advantageously for good conductivity and durability the metals of the electrode elements 3 will be one or more valve metals such as titanium, tantalum, zirconium or niobium. As well as the elemental metals themselves, the suitable metals of the electrode elements 3 can include alloys of these metals with themselves and other metals as well as their intermetallic mixtures. Of particular interest for its ruggedness, corrosion resistance and availability is titanium. A front, or "brine-facing", face of the electrode elements 3, as a whole or as a part thereof, can function as an anode with an electrochemically active coating which prevents passivation of the valve metal surface. The coating can be applied across a portion of the electrode face, e.g., on approximately a half, or on more or less than a half, of the face, such as in the manner of a stripe coating. As used herein, a coating over essentially a half or so of the bipolar electrode face is referred to for convenience as a "stripe" coating. It is also contemplated that the whole bipolar electrode face may be coated, e.g., the same coating over the whole face, or by use of a specific cathode coating adjacent a specific anode coating. In this regard it is contemplated that current reversal may at least occasionally be useful and thus assist in the cleaning of electrode surfaces.

The anodic electrochemically active coating may be provided from platinum or other platinum group metal, or it may be any of a number of active oxide coatings such as the platinum group metal oxides, magnetite, ferrite, cobalt spinel, or mixed metal oxide coatings, which have been developed for use as anode coatings in the industrial electrochemical industry. The platinum group metal or mixed metal oxides for the coating are such as have generally been described in one or more of U.S. Pat. Nos. 3,265,526, 3,632,498, 3,711,385 and 4,528,084. More particularly, such platinum group metals include platinum, palladium, rhodium, iridium and ruthenium or alloys of themselves and with other metals. Mixed metal oxides include at least one of the oxides of these platinum group metals in combination with at least one oxide of a valve metal or another non-precious metal.

For closing a pair of casing members, it is suitable that such pair be hinged together on one edge, e.g., a longitudinal edge in the manner of a book. The hinges may be conventional, with pins provided for easy removal, so as to facilitate complete removal of one casing member from the other if desired. Other fastening means found useful are buckles and hasps equipped with quick release latches which can be readily unlatched, providing tight closure during operation. Such fastening means lead to ready casing separation, i.e., opening of the "book", for cleaning and repair. Generally all such fastening fixtures, including hinges, will be metallic, e.g., steel including stainless steel, as well as bronze and plated metals as represented by chrome plated brass, although other elements, such as ceramic and plastic are contemplated.

The electrode terminals for the electrolyzer can be any of such members conventionally useful for supplying an impressed electrical current from outside a casing member to an internal primary electrode. Particularly useful are posts of a metal such as titanium, brass or titanium clad copper, which posts are mounted through the casing wall and contact the back face of the electrode, i.e., the face in contact with the casing member. Such contact may be a simple pressure contact, but will more usually involve metallurgical bonding. One preferred terminal assembly comprises a metal post which can be threadedly engaged to a lug, with the lug being welded to the electrode back face.

The following example shows a way in which the invention has been practiced. This example should not be construed as a limitation on the invention.

EXAMPLE

Two pieces of polyvinyl chloride (PVC) sheet approximately one inch (2.5 cm) thick, 22 inches (55.9 cm.) wide and 48 inches (121.9 cm.) long served as casing members. They are each machined to provide shallow depressions for inserting electrode elements. These depressions are one-quarter inch (0.6 cm.) deep and were each separated by one-quarter inch (0.6 cm.) PVC ribs retained in the casing during machining. The total of the electrode dimension area, but including rib space, is 20 inches (50.8 cm.) wide by 40 inches (101.6 cm.) long. The casing member as represented by FIG. 2 has a primary anode plate of electrolytically coated titanium. The electrocatalyst used is a mixed metal oxide electrocatalytic coating. The primary cathode plate is an uncoated titanium sheet. The four bipolar plates for the FIG. 2 casing member, as well as the five bipolar plates for the additional casing member are all titanium plates, each of which has half the height of the plate stripe coated with the above-described electrocatalytic coating. All electrodes are securely fastened to the PVC casing member by nylon screws which were placed centrally of each electrode plate. The titanium plates have thickness of 0.15 centimeter. Each electrode is separated from its next adjacent electrode by a one-half inch (1.27 cm.) casing member rib. The ribs are provided in the casing member during the machining thereof.

The casing members are secured together by metal hasps. A neoprene O-ring gasket is used to seal around the periphery of the casing members. One casing member has a 0.9525 centimeter deep rim, thereby providing, upon closing of the casing member pair, a fluid passageway that is 0.635 centimeter thick from electrode front face to opposite electrode front face, as well as 20 inches (50.8 cm.) wide. Exterior fluid inlet and outlet connections are provided as well as electrically conductive terminals, in the manner as shown in the Figures. Under test operation, a DC current is pressed upon the electrolyzer at a current rate of 50 Amperes. For test purposes a two percent (2%) concentration brine solution was passed through the electrolyzer at a flow rate of 5 gallons (18.9 liters) per minute and a temperature of 68° F. (20° C.). The brine solution enters the electrolyzer bottom and flows upwardly, the electrolyzer being oriented with vertical elongation. Under continuing operation at these conditions, a sodium hypochlorite with a total chlorine concentration of 561 milligrams per liter is generated. Under such operation, ten feet of head pressure is readily withstood without electrolyzer leakage.

We claim:

1. An electrolyzer for producing hypochlorite by the electrolysis of brine, wherein brine flow within a housing containing at least one bipolar electrode contained in an inner electrolyzer compartment, said electrolyzer comprising:
   an electrically non-conductive outer casing, said casing having a fluid inlet and a fluid outlet and being comprised of two casing members each having inner shallow depressions, with the members, upon closing together, providing a shallow, inner compartment;
   gasket means around the periphery of at least one casing member inner area surrounding the shallow depression of said member;
   flat, internal plate-like electrode elements in each of said casing members including at least one bipolar electrode, said electrode elements being affixed in the shallow depressions of said casing members, with individual electrode elements in one casing member being offset with respect to the electrode elements in the opposing casing member, whereby the anodic surface of a bipolar electrode in one casing member faces a cathodic surface of an electrode in the opposing casing member, forming an electrolytic cell therebetween;
   a fluid flow passageway between opposing faces of said electrodes, said passageway connecting to said fluid inlet and fluid outlet;
   binding means for fastening a broad face of each electrode to a casing member;
   fastening means for binding together said casing members; and
   electrode terminals mounted through a wall of at least one of said casing members for external connection to current leads and for connecting internally of said outer casing to electrode elements.

2. The electrolyzer of claim 1, wherein said non-conductive casing members are made from polyvinyl chloride, chlorinated polyvinyl chloride or glass-reinforced polypropylene.

3. The electrolyzer of claim 1, wherein said casing members are elongated and have a longitudinal axis, with said casing members being hinged along one longitudinal edge, while having quick-release latches as fastening means along an opposite longitudinal edge.

4. The electrolyzer of claim 1, wherein said fluid inlet and fluid outlet are contained within the same casing member.

5. The electrolyzer of claim 1, wherein said electrode elements include elements having broad, rectangular faces with the long axis thereof being transverse to a longitudinal axis of said casing members.

6. The electrolyzer of claim 3, whereins said casing members have longitudinal vertical axis and said casing has a lower fluid inlet and an upper fluid outlet.

7. The electrolyzer of claim 6, wherein one of said casing members contains a primary cathode plate as an uppermost electrode element and a primary anode plate as a lowermost electrode element.

8. The electrolyzer of claim 1, wherein said bipolar electrode comprises a valve metal plate having a thickness of not greater than about 0.65 centimeter and having an electrocatalytic coating on a portion only of one broad face of said plate.

9. The electrolyzer of claim 8, wherein said valve metal plate comprises metal selected from the group consisting of titanium, tantalum, zirconium, niobium their alloys and intermetallic mixtures.

10. The electrolyzer of claim 8, wherein said electrocatalytic coating comprises one or more of a platinum group metal or oxide and said oxide is selected from the group consisting of platinum group metal oxides, magnetite, ferrite and cobalt oxide spinel.

11. The electrolyzer of claim 8, wherein said electrocatalytic coating comprises a mixed material of at least one oxide of a valve metal and at least one oxide of a platinum group metal.

12. The electrolyzer of claim 8, wherein said coating is a stripe coating.

13. The electrolyzer of claim 1, wherein said electrode elements in each casing member are spaced apart, one from the other, in an amount from about 1 to about 4 centimeters, by non-conductive casing member ribs contained within the shallow depression of each casing member.

14. The electrolyzer of claim 1, wherein each of said casing members contains at least one bipolar electrode.

15. The electrolyzer of claim 1, wherein each of said casing members has a peripheral projecting rim, said gasket means is contained in the rim of at least one casing member, and said projecting rims, on fastening said casing members together, provide space for said fluid flow passageway between opposing electrode elements.

16. The electrolyzer of claim 1, wherein said fluid flow passageway is from about 0.3 to about 1 centimeter in thickness between opposing electrode elements.

17. The electrolyzer of claim 1, wherein the ratio of the spacing of electrodes, spaced apart one from the other in a casing member, to the thickness of the fluid flow passageway, is between about 1:1 and 8:1.

18. The electrolyzer of claim 1, wherein the full active surface of said bipolar electrode is coated.

19. In an electrolyzer for producing hypochlorite by the electrolysis of brine, wherein brine flows within a housing containing at least one bipolar electrode, said housing being comprised of casing members which close together to provide therebetween a shallow, inner electrolyzer compartment, the improvement in said electrolyzer comprising:
   an elongated electrically non-conductive casing member having a longitudinal axis, an outer cover area and a shallow, depressed inner area;

gasketing means around the periphery of said inner area surrounding said shallow depression;

a series of flat, plate-like electrode elements, including at least one bipolar electrode, positioned in said shallow depression and narrowly spaced apart one from the other;

binding means for fastening each plate-like electrode elements to said casing member; and fastening means for binding said casing member to an additional casing member for forming said casing.

20. The electrolyzer housing of claim 19, wherein said casing member contains a lower fluid inlet and an upper fluid outlet.

21. The electrolyzer housing of claim 19, wherein said electrode elements include a primary cathode plate as a lowermost electrode element and a primary anode plate as an uppermost electrode element.

22. The electrolyzer housing of claim 19, wherein said casing member contains electrode terminals mounted through said casing member.

23. The electrolyzer housing of claim 19, wherein said flat, plate-like electrode elements are spaced apart in an amount from about 1 to about 4 centimeters by non-conductive ribs contained within said shallow depression of said casing member.

24. The electrolyzer housing of claim 19, wherein said electrode elements have broad, rectangular faces with the long axis thereof being transverse to a longitudinal axis of said casing member.

25. The electrolyzer housing of claim 19, wherein said casing member has a peripheral projecting rim and said gasketing means is contained within said rim.

26. The electrolyzer housing of claim 19, wherein said bipolar electrode comprises a valve metal plate having a thickness of not greater than about 0.65 centimeter and having an electrocatalytic coating on a portion only of one broad face of said plate.

27. The electrolyzer housing of claim 26, wherein said valve metal plate comprises metal selected from the group consisting of titanium, tantalum, zirconium, niobium their alloys and intermetallic mixtures.

28. The electrolyzer housing of claim 26, wherein said electrocatalytic coating comprises one or more of a platinum group metal or oxide and said oxide is selected from the group consisting of platinum group metal oxides, magnetite, ferrite and cobalt oxide spinel.

29. The electrolyzer housing of claim 26, wherein said electrocatalytic coating comprises a mixed material of at least one oxide of a valve metal and at least one oxide of a platinum group metal.

30. The electrolyzer housing of claim 26, wherein said coating is a stripe coating.

31. In an electrolyzer for producing hypochlorite by the electrolysis of brine, wherein brine flows across faces of bipolar electrodes, the improvement in said electrolyzer comprising at least one flat, plate-like bipolar electrode of a valve metal plate having one broad valve metal back face in contact with a non-conductive casing member and an obverse, brine-facing broad front face of valve metal having striping of an electrocatalytic coating.

32. The electrolyzer of claim 31, wherein said bipolar electrode comprises a valve metal plate having thickness of not greater than about 0.65 centimeter, having said back face in pressed, face-to-face contact with said casing member, and having an electrocatalytic stripe coating on said front face.

33. The electrolyzer of claim 32, wherein said valve metal plate comprises metal selected from the group consisting of titanium, tantalum, zirconium, niobium their alloys and intermetallic mixtures.

34. The electrolyzer of claim 32, wherein said electrocatalytic coating comprises one or more of a platinum group metal or oxide and said oxide is selected from the group consisting of platinum group metal oxides, magnetite, ferrite and cobalt oxide spinel.

35. The electrolyzer of claim 32, wherein said electrocatalytic coating comprises a mixed material of at least one oxide of a valve metal and at least one oxide of a platinum group metal.

36. The electrolyzer of claim 32, wherein said brine flows across faces of opposing bipolar electrodes housed in opposing casing members, with each bipolar electrode in one casing member being offset in relation to the bipolar electrodes of the opposing casing member.

37. A bipolar electrolyzer, in particular for producing hypochlorite by the electrolysis of brine, comprising:

a pair of generally flat casing members of electrically non-conductive material which close together at their periphery to form therebetween a shallow inner electrolysis compartment;

one of the casing members carrying on its inside face n flat bipolar electrodes each having an anode section and a cathode section, where n is a whole number including 1;

the other casing member carrying on its inside face a flat terminal anode section, a flat terminal cathode section and (n−1) flat bipolar electrodes each having an anode section and a cathode section;

each bipolar electrode being offset in relation to the opposing bipolar electrode(s) and the terminal anode and cathode sections whereby each anode section of the one casing member faces a cathode section of the other casing member;

means for connecting the terminal anode section and the terminal cathode section of said other casing member to an external current supply; and inlet and outlet means for introducing electrolyte into and removing electrolyte and the product of electrolysis from the electrolysis compartment.

38. The electrolyzer of claim 37, wherein the inlet means is arranged in the bottom of said other casing member and the outlet means is arranged in the top of said other casing member, said casing members being hinged together whereby said one casing member can be swung open to access the electrolysis compartment.

39. In a bipolar electrolyzer, in particular for producing hypochlorite by the electrolysis of brine, the improvement comprising:

a generally flat casing member of electrically non-conductive material which closes together at its periphery with a second casing member to form therebetween a shallow inner electrolysis compartment;

a terminal anode and a terminal cathode on the inside face of said flat casing member;

at least one flat bipolar electrode having an anode section and a cathode section on the inside face of said flat casing member and spaced between said terminal anode and terminal cathode;

means for connecting the terminal anode section and the terminal cathode section of said flat casing member to an external current supply; and inlet and outlet means for introducing electrolyte into and removing electrolyte and the product of electrolysis from the electrolysis compartment.

40. The method of producing electrolysis product wherein liquid electrolyte flows within a housing containing at least one bipolar electrode, said housing being comprised of a pair of casing members which close together to provide therebetween a shallow, inner electrolysis compartment, which method comprises:

connecting to a first casing member electrolyte inlet and outlet means for introducing electrolyte into and removing electrolyte and the product of electrolysis from the electrolysis compartment;

connecting to said first casing member electrical current supply and removal means for introducing current to and removing current from electrodes housed within said casing member;

securing the resulting electrolyte and electrically connected first casing member to a second casing member by hinges permitting swinging opening of said members;

securing in closed position said first and second hinged casing members by quick-release fastening means providing a liquid tight inner electrolysis compartment;

feeding liquid electrolyte to said first casing member and through said electrolyte inlet means for flowing into contact with electrodes housed in said inner electrolysis compartment; and supplying electrical current to said first casing member through said electrical current supply means.

* * * * *